United States Patent Office 3,262,795
Patented July 26, 1966

3,262,795
BASIC FUSED REFRACTORY
Ben Davies, Ernest P. Weaver, and Peter H. Havranek, Pittsburgh, Pa., assignors to Harbison-Walker Refractories Company, Pittsburgh, Pa., a corporation of Pennsylvania
No Drawing. Filed June 24, 1964, Ser. No. 377,477
4 Claims. (Cl. 106—58)

This invention relates to basic refractory brick and to the refractory material for the manufacture thereof. More particularly, this invention relates to a basic refractory fusion of high purity and controlled accessory oxide content, which exhibits physical and mechanical properties significantly improved, as compared to brick of similar chemical content, but lacking the controlled composition of the present invention, and to the method of manufacturing the fusion.

Although not limited to such use, the basic refractory provided by this invention is especially suited for use in connection with the production of steel by the modern oxygen blowing process, sometimes referred to as the LD process, the rotor process, the Kaldo process and, among other terms, merely as oxygen steel making. In such a process, the steelmaking reactions are greatly accelerated by the introduction of gaseous oxygen, generally above the molten metal bath surface within the oxygen furnace or converter. A basic slag is used, which necessitates the use of basic refractories.

The principal basic refractories of industry for use in the fabrication of furnaces for the practice of the oxygen blowing process include products of dead burned magnesite or magnesia (we use these terms synonymously, but intend to describe a hard-fired material of well developed periclase crystals, and including at least about 95% MgO on an oxide basis), or dead burned dolomite. (The latter is actually a misnomer, since the dead burned product obtained from hard firing of dolomite is a mixture of periclase and calcia.) Refractories made entirely from lime or calcia have also been proposed, because of the extreme refractoriness thereof, but their tendency to hydrate upon exposure to moisture in the air has limited their use.

The basic refractory brick of industry have been used with varying degrees of success in the basic oxygen furnace. The refractory is subjected to unusually severe conditions and, as a result (since the introduction of this steelmaking method) there has been continuous experimentation looking toward the development of better refractories. In large part, the basic refractory used for these linings is tar bonded or tar impregnated. The former—tar bonded—is, in essence, a shape fabricated of selected basic refractory particles held together by a tar bond. Such are classed as unfired refractories. The tar impregnated refractories are, in essence, ceramically bonded shapes, i.e. shapes of basic refractory material which have been fired to a high enough burning temperature to obtain a sintered ceramic bond through the particles which make up the shape or brick. These ceramically bonded shapes are then immersed in heated tar or pitch to thoroughly impregnate them. The present invention, in one aspect, is particularly concerned with the class of ceramically bonded refractory. In our discussion herein, we refer to nonaqueous, cokable, carbonaceous bonding materials. This is art-recognized terminology for petroleum and coal tars and pitches suitable for use in bonding and/or impregnating basic refractory brick. A good dissertation on preferred ones is found in the United States Patent No. 3,070,449, entitled "Refractory Practices," which issued to Ben Davies and Ernest P. Weaver on Christmas day of 1962.

The quantities of such nonaqueous, cokable, carbonaceous materials, which are used to impregnate or bond oxygen steelmaking basic refractory shapes, are also well known to the art. Preferably, the tar amounts to between about 3 and 10%, by weight, based on the weight of the refractory, with the preferred amount being between about 4 and 8%, by weight.

Earlier basic refractories for use in the oxygen converter, made of the basic refractory materials magnesia, dolomite, and calcia, mentioned above, are—in many instances—difficult to work with, because of their susceptibility to pronounced hydration. Many workers have suggested stabilization of these materials against attack by moisture, although, to date, true stabilization has not been achieved with serious impairment by refractoriness. Iron oxide ($Fe_2O_3$) has been widely used as a stabilizing additive; for instance, on the order of 5 to 8%, by weight. Such an iron oxide addition has suppressed the tendency of lime and dolomite to hydrate; but the reaction of lime or calcia and iron oxide results in the formation of dicalcium ferrite ($2CaO \cdot Fe_2O_3$) which melts at the relatively low temperature of 2650° F. compared to the melting point of pure lime of about 4675° F. Calcined lime and dolomite, in the absence of stabilizing agents, however, do not have the high density and concomitantly low porosity desired for refractory use. Iron oxide advantageously improves density, but its presence, for the reasons just noted, has seriously adverse effect up refractoriness.

Recent developments in the refractories industry have assured the continued and accelerating success of the oxygen steelmaking process, since refractories are now available for lining the converter which afford a satisfactorily high life, even under the most difficult furnace operating conditions. Generally, furnace life is meausursed in terms of the number of heats a working lining will last or the total tonnage of steel produced before relining becomes necessary. The destruction of refractory of a working lining is, in large part, caused by corrosive and/or erosive attack by the oxygen converter slag. A problem with many previously available basic refractories, which were otherwise satisfactory as far as resistance to slag, was inadequate hot strength. It is accordingly an object of this invention to provide novel fused refractory material, and improved ceramically bonded brick made therefrom which exhibit excellent resistance to the corrosive slags of the oxygen converter process, and which show excellent strength at elevated temperatures.

A fused basic refractory material, in accordance with the present invention, is a melted, resolidified, highly crystalline material of controlled chemistry and physical structure to provide substantial freedom from amorphous vitrified phases and spinels. On the basis of an oxide analysis, it consists essentially of at least 96%

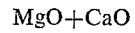

MgO+CaO the MgO ranging from about 50 to 95% and the CaO from about 50 to 5%. The remaining 4% of the refractory is, in large part, made up of undesirable impurities which must be severly and critically limited. No more than about 4% of these impurities can be tolerated. The impurities are predominantly $SiO_2$, $Al_2O_3$, and $Fe_2O_3$. By predominantly, we mean at least 50% of the impurities are these latter three oxides. Of these impurity oxides, the iron oxide, expressed as $Fe_2O_3$, is the most troublesome. It should be limited to no more than 50% of the total impurities or 2% of the total by weight of the fused grain. Likewise, the alumina or $Al_2O_3$ is controlled. By severely delimiting the amount of $Fe_2O_3$ and $Al_2O_3$, we are able to prevent formation of more than traces of spinels. By controlling the silica, or $SiO_2$, we are able to substantially eliminate any amorphous vitrified phases, and to assure that the lime content of the shape does not react to form harmful amounts of undesirable low melting phases by reaction with the silica. In the preferred practice, the total $SiO_2$, $Al_2O_3$, and $Fe_2O_3$ impurities constitute less than about 3% of the total batch.

The fusion is further characterized by a macro-crystalline structure, in which relatively large abutting crystals are directly bonded to each other with any spinel, aluminates, ferrites, etc., or silicate present as isolated pockets within single crystals and as discontinuous films between the crystals.

Suitable raw material for the fusion is selected from the group consisting essentially of crude or burned dolomite, compounds of lime and magnesia, including mixtures thereof, which material satisfies the critical chemistry, above discussed. Suitable material is that manufactured according to the process of the United States patent to Snyder et al., No. 3,060,000, or the patent to Leatham et al., No. 3,060,042.

Fusions were made for test purposes in a conventional electric arc melting furnace. The fusions had magnesia to calcia weight ratios of about 70/30, 80/20, and 92/8. All of the fusions were very dense and were characterized by the large macro crystal structure, mentioned above. In addition, a fusion was made of commercial dolomite containing about 50% CaO, 40% MgO, 6.8% $Fe_2O_3$, and about 1.5% $Al_2O_3$. The other three fusions had a total MgO+CaO content of 98 to 99%.

A series of brick was made from the fusions. To make the brick, the fused material was crushed and size graded to provide similar brickmaking batches. The size grading was about as follows: about −4 +10 mesh 30%, about −10 +28 mesh 35%, the remaining 35% passing a 28 mesh screen, and with about 20% of the total batch passing a 325 mesh screen. These batches were initially bonded together with about 4% of a carbonaceous bonding material heated to about 200° F. above its softening point, and formed on a mechanical brick press at about 8000 p.s.i. The brick were burned to cone 30 (about 2900° F.). Ceramically bonded brick, which were recovered from the burn, were free of any organic or carbonaceous residue.

The brick of the fused dolomite containing a large amount of iron oxide and alumina, shrank almost 2% (we term this linear change in burning). The other four brick of the fused grain showed fractional shrinkage, i.e. on the order of 0.0 to 0.2%. Brick of each type (the three fusions according to the invention and the comparative one of fused commercial dolomite grain) were subjected to a slag test. The slag test consisted of placing half brick in a furnace and heating them to about 2900° F. The brick were tilted so their upper surface, about 4½″ long by 4½″ wide, sloped at about 30° relative to the horizontal or furnace hearth. 600 grams of "early" and "late" oxygen converter slag were intermittently allowed to drip and run across the sloped surface of separate test brick. The brick of the fused commercial dolomite had a 32 cc. volume erosion by the slags. The brick of the 70/30 and 20/80 magnesia/calcia weight ratio fusion had very low erosions when subjected to the early and late slags; namely, 3 and 5 ccs. The brick of the other fusion, having the 92% magnesia/8% calcia ratio, had a higher erosion than the other two preferred mixes but were still satisfactory.

The modulus of rupture at 2300° F. with a 5-hour hold was considered excellent for the brick made of the three fusions of this invention, i.e. all of them were above 1400 p.s.i., with the 70/30 magnesia to calcia fusion brick exceeding 1840 p.s.i. The great majority of prior basic brick used in the oxygen converters have shown values of less than 250 p.s.i. in this test for hot strength.

Additional tests were run in which the crushed fusion products constituted only the coarser +28 mesh fraction of the brick batch. The remaining −28 mesh fraction was of a nonfused grain of the type manufactured according to the Snyder et al. Patent No. 3,060,000, mentioned above. The overall sizing of the batches used to make these additional test brick was substantially identical to those noted above made entirely of the fusions. These brick are also provided satisfactory and better than the comparative fused dolomite one.

In the testing just discussed, the brick were all non-tar impregnated. However, as noted above, such brick are conventionally impregnated with tar for use in oxygen converter vessels. We prepared additional test specimens, in all respects similar to those above discussed, and impregnated them with tar. In substantially identical testing, including the slag test, the brick were proved satisfactory in resisting oxygen converter slags.

Although the foregoing description has, in large part, been specially concerned with describing the manufacture of ceramically bonded oxygen converter brick, the refractory fusion of this invention is not limited thereto, but can be used with advantage in making chemically bonded basic brick or like articles in which more conventional bonding agents are used, such as tar, lignin, and the like.

Mesh sizes referred to in the foregoing description are of the Tyler series. Sizing, of course, has been given in general terms, and variation may be had from those specifically set forth above according to techniques well known to those skilled in the art in size grading brickmaking batches.

An exemplary chemical analyses of the early and late oxygen converter slags, which were used in the tests above described, is as follows:

|  | Early, percent | Late, percent |
|---|---|---|
| Silica ($SiO_2$) | 33.5 | 19.1 |
| Alumina ($Al_2O_3$) | 0.4 | 0.4 |
| Iron Oxide ($Fe_2O_3$) | 11.2 | 19.2 |
| Titania ($TiO_2$) | 0.4 | 0.4 |
| Manganese ($MnO_2$) | 6.0 | 5.5 |
| Lime (CaO) | 41.0 | 45.3 |
| Magnesia (MgO) | 5.2 | 5.5 |
| Phosphorous ($P_2O_5$) | 0.6 | 0.9 |

In one aspect, this invention relates to improvements in the copending application King et al., Serial No. 266,796 (U.S. Patent No. 3,141,784), owned by the same assignee as the present invention, and entitled "High Temperature Refractory," filed March 21, 1963, and owned by the same assignee as the present invention. The oxide chemistry of the melted and resolidified material of this invention is substantially identical to that disclosed and claimed in said copending application. The primary physical difference between them is arrangement and size of crystal structure. The fused crystals seem almost continuous whereas sintered crystals in MgO–CaO systems are small and usually joined, to some extent, by silicates. We have found that a change in the physical state of the ingredients from that of the copending application to the massive macro-crystalline structure of the present invention, together with the isolation of undesirable spinels and silicates, greatly improves resistance to the corrosive effect of oxygen converter slags to an unexpected degree.

Having thus described the invention in detail and with sufficient particularity as to enable those skilled in the art to practice it, what is desired to have protected by Letters Patent is set forth in the following claims.

We claim:

1. A fired refractory shape to be exposed to very high temperatures, said shape made of basic refractory particles, said particles made from a melted, resolidified and crushed mixture of material selected from the group consisting essentially of dolomite, lime, and magnesia, and analyzing, by weight on an oxide basis, at least 96% MgO+CaO, the MgO ranging from about 95 to 50% and the CaO ranging from at least 5 to about 50%, the remainder consisting essentially of $SiO_2$, $Al_2O_3$, and $Fe_2O_3$, said particles being highly crystalline and characterized by substantial freedom from amorphous vitrified phases and spinels, said vitrified phases and spinels present only as discontinuous films and pockets distributed through the crystalline structure of the particles.

2. The fired shape of claim 1 in which the MgO/CaO weight ratio is between about 90/10 and 70/30 MgO to CaO.

3. The fired refractory shape of claim 1 in which the MgO+CaO content is in the range 98–99%, by weight on an oxide basis.

4. A melted, resolidified, and crushed mixture consisting essentially of at least 96% MgO and CaO, by weight on an oxide basis, the MgO content ranging from about 95–50%, the CaO from at least 5 to about 50%, the remainder consisting essentially of $SiO_2$, $Al_2O_3$, and $Fe_2O_3$, said resolidified mixture being highly crystalline and characterized by substantial freedom from amorphous vitrified phases and spinels, said vitrified phases and spinels being present only as thin discontinuous films and isolated pockets between the crystals of said mixture.

References Cited by the Examiner
UNITED STATES PATENTS

| | | | |
|---|---|---|---|
| 2,316,229 | 4/1943 | Berlek | 106—59 |
| 2,952,605 | 9/1960 | De Varda | 106—58 |
| 3,030,228 | 4/1962 | Hernandez et al. | 106—58 |
| 3,060,000 | 10/1962 | Snyder et al. | 106—58 |
| 3,060,042 | 10/1962 | Leatham et al. | 106—58 |

TOBIAS E. LEVOW, *Primary Examiner.*

J. POER, *Examiner.*